Patented Feb. 5, 1935

1,989,717

UNITED STATES PATENT OFFICE 1,989,717

METHOD OF MAKING RUBBER ARTICLES

Andrew Szegvari, Akron, Ohio, assignor to American Anode, Inc., Akron, Ohio, a corporation of Delaware No Drawing. Application October 29, 1930, Serial No. 492,094

14 Claims. (Cl. 41—33)

This invention relates to the art of rubber manufacture, and particularly to the production of raised designs, lettering, etc., of rubber, as well as rubber coatings over portions only of objects.

It has heretofore been proposed to manufacture rubber articles or produce rubber coatings by dipping a form successively in a liquid coagulant and in liquid latex, the film of coagulant remaining on the form causing the coagulation of the subsequently applied latex. This previously known process, however, has not been adapted to the production of discontinuous coatings, or coatings possessing a variable thickness.

An object of this invention is accordingly the production of dipped rubber products of varying thickness. Another object is the production of rubber deposits or coatings over only the desired limited portion of the surface of a base or form. A further object is the production of decorative designs, lettering, etc., on rubber articles. Other objects will be evident from the following description of the invention.

This invention is practiced by providing a base or form with a film of coagulant over a portion only of its surface, and then bringing the coagulant-coated surfaces in association with a body of a coagulable aqueous dispersion of rubber or like substance. The coagulant may be applied by brushing, spraying, by transferring from another surface, etc., and may be associated with the aqueous dispersion by immersion therein, or by flowing or spraying the dispersion over the coagulant-treated surface.

For example, a rubber acid glove is to be prepared with a thickened portion on the palm and the inside of the fingers where it is exposed to the greatest wear. The porcelain glove form is cleaned and a coagulant liquid such as a solution of one part of hydrated calcium nitrate in two parts of acetone is brushed over the palm of the form. The major part of the acetone is permitted to evaporate in order that the coagulant may acquire a viscosity high enough to prevent its displacement by the liquid dispersion, and the form is then immersed in a vulcanizable latex. After the desired thickness of rubber has coagulated on the palm, say after 5 minutes, the form is removed from the latex, completely immersed in a tank of the coagulant liquid, permitted to dry for 1 minute, more or less, and re-immersed in the latex for 10 minutes. The form is then removed from the latex and immersed for several hours in a tank of running hot water to leach out water-soluble substances, including the coagulant, after which the rubber is dried and vulcanized in the usual manner. The thickness of the rubber over the palm of the glove will be found to be quite uniform, but distinctly greater than that over the remainder of the glove.

In an alternative process for the production of rubber coatings of variable thickness similar to the glove described above, the form may be coated uniformly with a solid or semi-solid coagulant film by dipping in a solution such as the above-mentioned calcium nitrate solution, and drying. A second film of the same or a different coagulant is then applied over those portions of the surface where the rubber coating is to acquire a greater thickness. When the treated form is dipped in the latex, the thickness of the rubber layer coagulated on the surface of the form is found to be roughly proportional to the amount of coagulant on the various portions of the form. It is thus possible to obtain the same results as were described above in a single dip in latex instead of in two dips.

In the etching of glass panes, mirrors, etc., by sand-blasting, the portions of the glass which are to retain their polished surface are protected from the sand-blast by some soft, resilient substance. Rubber may be employed by applying a coagulant to such portions of the surface, for example by painting, or by spraying through a stencil, or by printing with a rubber stamp, and then immersing the glass in latex for a few moments. The latex in contact with the coagulant-treated surfaces is coagulated as a firm, adherent coating, while the remainder of the surface is covered only by an uncoagulated, liquid film which is readily removed. The uncoagulated latex is washed off the glass with water, preferably make weakly alkaline with ammonia, whereupon the glass is ready for the sand-blasting. Afterwards the protective layer of rubber is readily removed by rubbing, exposing the polished surfaces again.

Where an object is to be provided with a permanent coating of rubber over a portion only of its surface, an adhesive substance is preferably applied to that portion of its surface either before the coagulant is applied or simultaneously therewith. For example, 10 parts of glacial acetic acid is cautiously stirred into a solution of 15 parts of an adhesive, artificial rubber isomer in 100 parts benzol. The adhesive rubber isomers disclosed in the patent to Geer, No. 1,617,588, of Feb. 15, 1927, are particularly suitable. A plating rack for supporting metallic articles while they are electroplated has the areas which are to remain bare and conduct the current masked with paper or other suitable material, whereupon the remainder of the surface is coated with a thin layer of the above solution by spraying. The masks are removed and the rack is dipped in a vulcanizable latex until the desired thickness of rubber is coagulated. The excess uncoagulated latex is washed off the untreated portions of the rack and the deposited rubber is washed in hot running water to remove water-soluble substances, including the coagulant. The adhesive rubber isomer, however, being insoluble in water, remains between the rubber and metal as a thin film which causes the rubber to adhere permanently to the metal after vulcanization.

Paper, wood, or other fibrous material is provided with a decorative coating over a portion of its surface by printing on the surface with a thick rubber cement containing approximately 5% of acetic acid. After the cement has partially dried the fibrous material is immersed in latex which is coagulated on the treated portion of the surface by contact with the acid-containing cement. The uncoagulated latex is washed off the untreated surfaces, for example, by successive treatment with a solution of a ½% of soap and ½% ammonia, a solution containing ½% ammonia, and then ordinary tap-water. Such decorative coatings may possess almost any desired outline from the simplest figures to the most complex, and may even include lettering, for the outlines of the coatings are very sharp and distinct.

Rubber articles may be provided with raised or embossed lettering or other designs, which may be in contrasting colors from the rubber base, by applying a coagulent to a suitable base by printing it thereon, spraying through a stencil, etc. For example, a felt pad is saturated with a solution of calcium nitrate in acetone or methanol, and a rubber stamp with a surface of the desired configuration is moistened with the coagulant, which is transferred to a sheet of calendered paper by a printing operation. The paper is thereupon immersed in a colored latex. After a short time the paper is removed and the excess uncoagulated latex washed off as described in the preceding paragraph. The rubber letters or other designs are transferred to the rubber article, which is preferably unvulcanized, by pressing the side of the paper which carries the rubber deposits firmly against the article and then stripping off the paper. The rubber may then be vulcanized as usual, preferably in open steam or dry heat. It should be noted that in this process the lettering is twice transferred, once from the stamp to the paper and once from the paper to the rubber article, hence the letters in the stamp should not be reversed as in ordinary ytpe, but should be made exactly as they are to appear on the finished article. If desired, different letters or different portions of a design may be produced in different colors and separately transferred to the rubber article in the predetermining location.

It is likewise possible to produce raised designs or lettering directly on the rubber by applying the coagulant directly thereto and immersing the rubber article itself in the latex. However, it will generally be found that it is more convenient, and that better results are secured, when the rubber is transferred from another surface as described above, particularly when the design or lettering is to be applied to a small portion only of the rubber articles. The lettering may even be produced on a sheet of unvulcanized rubber which is then cut out in the form of a medallion or manufacturer's label and affixed to the rubber article as a complete unit. This process is also applicable to the transfer of rubber letters to the surfaces of other substances such as metal, wood, paper, etc., an adhesive being preferably employed in this modification.

In the examples given above certain specific coagulants have been described, but it is to be understood that other coagulants may be substituted therefor. For example, salts of polyvalent metals, such as magnesium chloride, calcium chloride, calcium nitrate, calcium lactate, zinc chloride, aluminum chloride, etc., may be employed, either alone or together with a free acid, in solution in water or an organic solvent such as alcohol, ether, acetone, an ester, etc. The coagulant may consist of a free acid such as formic, acetic, citric, lactic, hydrochloride, etc., in an appropriate solvent or diluent. The coagulant may contain colloids, high-boiling solvents, wetting agents, etc., to modify its properties for particular uses.

The aqueous dispersion may be any natural or artificial dispersion of rubber or a like substance, including natural latices of caoutchouc and gutta-percha, artificial dispersions of crude rubber, synthetic rubber, reclaimed rubber, rubber isomers, etc. The dispersion may be concentrated, or vulcanized, or otherwise treated before it is used, and may contain pigments, softeners, vulcanizing agents, or other additions.

It is therefore to be understood that this invention is not limited to the examples enumerated above, which are merely illustrative of certain manners of carrying out my invention, but that numerous modifications may be introduced without exceeding the spirit and scope of the invention as defined in the appended claims.

I claim:

1. The method which comprises applying to the surface of a base a film of coagulant whose thickness varies over the said surface, and thereafter applying a coagulable dispersion of rubber.

2. The method which comprises applying a coagulant to a portion only of the surface of a base, in a predetermined design, and thereafter applying a coagulable dispersion of rubber.

3. The method which comprises applying a coagulant to the surface of a base in a predetermined design, and thereafter dipping the base in an aqueous dispersion of rubber.

4. The method which comprises coating a portion only of the surface of a base with a coagulant solution in a predetermined design, placing the base in contact with a body of an aqueous dispersion of rubber, and drying the coagulated rubber.

5. The method which comprises applying a film of a solution of a coagulant in a volatile solvent to a base in a predetermined design, permitting the major portion of the solvent to evaporate, and dipping the base in an aqueous dispersion of rubber.

6. The method which comprises applying a coagulant to a figured surface, transferring the coagulant from the figured surface to the surface of a base by a printing operation, immersing the treated base in an aqueous dispersion of rubber, and drying the coagulated rubber.

7. The method which comprises applying a coagulant to the surface of a base in a predetermined design, immersing the base in an aqueous dispersion of rubber, and drying and vulcanizing the coagulated rubber.

8. The method which comprises coagulating the rubber from an aqueous dispersion of rubber locally on a base member in a predetermined configuration, and transferring the coagulated rubber deposits from the surface of the base member to another surface by contact therewith.

9. The method which comprises coagulating the rubber from an aqueous dispersion of rubber locally on a base member in a predetermined configuration, and transferring the coagulated rubber deposits from the surface of the base member to the surface of a flexible sheet material by contact therewith.

10. The method which comprises coagulating the rubber from an aqueous dispersion of rubber locally on a base member in a predetermined design, and transferring the coagulated rubber deposits to a rubber surface by contact therewith.

11. The method which comprises applying a coagulant to a base in a predetermined design, immersing the base in an aqueous dispersion of rubber, and transferring the deposited rubber to a continuous rubber surface by pressing the base with the rubber deposits thereon against the rubber surface and removing the base.

12. The method which comprises applying a film of a liquid coagulant to the surface of a base member in a predetermined design, immersing the base member in an aqueous dispersion of rubber, transferring the deposited coagulated rubber to an unvulcanized rubber surface by contact therewith, and vulcanizing the rubber.

13. The method which comprises applying a film of a solution of a coagulant in a volatile solvent to the surface of a base member in a predetermined design, permitting a major part of the solvent to evaporate, immersing the base member in an aqueous dispersion of rubber, transferring the deposited coagulated rubber to an unvulcanized rubber surface by contact therewith, and vulcanizing the rubber.

14. The method which comprises applying a coagulant to a figured surface, transferring the coagulant from the figured surface to the surface of a base member by a printing operation, immersing the base member in a latex composition of one color, transferring the deposited coagulated rubber to an unvulcanized rubber composition of another color by contact therewith, and vulcanizing the rubber.

ANDREW SZEGVARI.